J. A. DUGDALE.
Bee Hive.
No. 6,622.
Patented July 31, 1849.
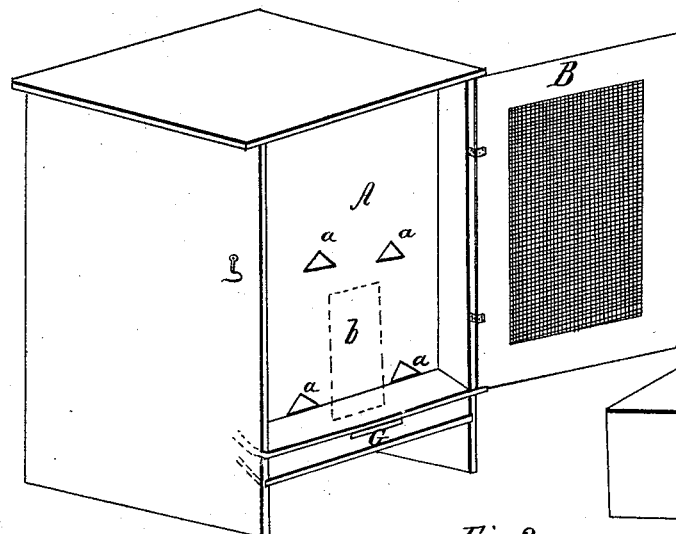
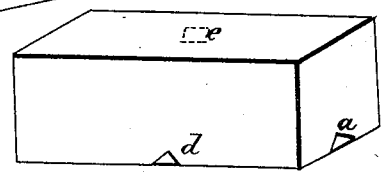
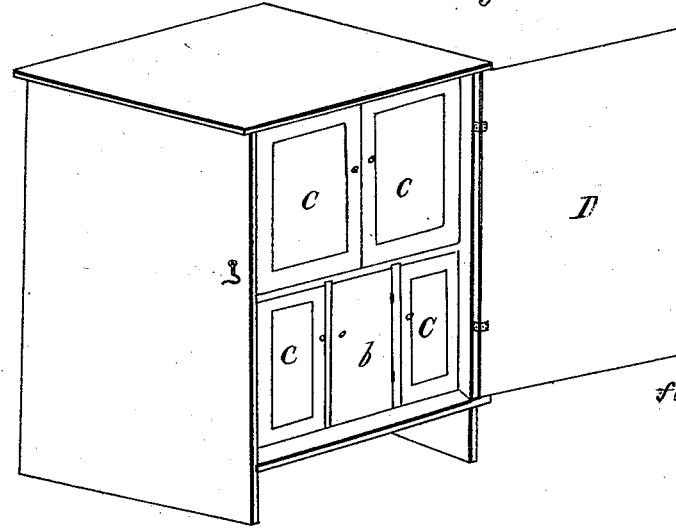
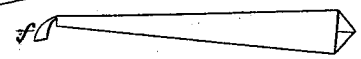

UNITED STATES PATENT OFFICE.

JOS. A. DUGDALE, OF SELMA, OHIO.

BEEHIVE.

Specification of Letters Patent No. 6,622, dated July 31, 1849.

*To all whom it may concern:*

Be it known that I, JOSEPH A. DUGDALE, of Selma, in Clark county, in the State of Ohio, have invented a new and useful Improvement in the Beehive; and I do hereby declare that the following is a full, clear, and exact description of the construction and operation of the same, reference being had to the annexed drawings, which make a part of this specification, in which—

Figures 1 and 2 are perspective views, showing the front and rear of the hive. Fig. 3 is one of the drawers or boxes, and Fig. 4, is the conductor.

In Fig. 1, A, is the front of the hive, $a$, $a$, $a$, $a$, are four triangular openings through which the bees pass into, and out of the hive.

B, is a large sash door, covered with a screen of woven wire. This door covers the whole front of the hive except the lower part, which is left for the entrance of the bee moth (shown at G) into an apartment between the two lower boxes (shown by dotted lines at $b$). This apartment is reserved exclusively for the bee moth. The entrance G, being four inches long and but the sixteenth of an inch in width, admits the moth but the bee cannot enter. In the moth department, I place honey and arsenic or other poisonous substance, and when the moth is destroyed it is removed at pleasure.

In Fig. 2, C, C, C, C, represent four boxes or drawers, the ends of which are glazed, and having knobs by which they may be easily withdrawn. The opposite ends have triangular openings corresponding to, and communicating with the openings $a$, $a$, $a$, $a$, in Fig. 1, and better shown in Fig. 3. $b$, is a door, opening into the bee moth apartment already described, by which the poisoned honey may be introduced and the dead moths removed. D, is a large door covering the whole rear of the hive.

Fig. 3, represents one of the upper boxes or drawers, $a$, being a triangular opening, similar to, and communicating with the corresponding opening $a$, in Fig. 1. A similar communication is had between the two upper boxes, by openings at the side of each, shown in this figure at $d$. Besides those described, there are also square openings in the bottom of the upper boxes (shown by dotted lines at $e$,) which are opposite to similar ones in the top of the lower boxes, so that the bees once within the hive, have access to every part of it except the moth room.

The hive stands upon the side boards which come down a little below the bottom board of the hive—through this bottom board and the two lower boxes are small openings covered with a screen of woven wire to exclude the moth and admit ventilation.

Fig. 4, represents the conductor, which is of tin or other material and of a triangular form, tapering toward the outer end, having upon that end a lip or shield (see $f$) which effectually prevents the return of the bees. In using the conductor, the larger end is inserted into the opening which communicates with the box which it is intended shall be removed or exchanged, tin slides are then inserted so as to cut off the communications between this and the other boxes, the bees then passing out by the conductor are effectually prevented from returning by that passage, by the shield already described when the box may be removed or exchanged at pleasure.

I construct my hives about 26 inches high and $21\frac{1}{2}$ inches wide, and with four boxes, they may be called double hives, as they will contain two families or swarms of bees. The two upper and largest boxes, are $13\frac{1}{2}$ inches long, $9\frac{1}{4}$ inches wide and $11\frac{1}{2}$ inches high. The two lower ones, are $6\frac{1}{4}$ inches wide and of the same length and height as the others.

It will be seen by the drawings in Fig. 1 that I leave a space of three inches between the openings in the hive and the screen door (B in same figure). This space is intended to accommodate the peculiar habits of the bees which is to hang in clusters at times, on the outside of the hive—the bee may be thus undisturbed in this peculiar habit outside the hive, yet within the screen, when closed. This screen door, may therefore be closed at night (the only time when the moth is troublesome) and does thus afford ample protection to the bees. This last device may be applied to any common hive so as to afford its inhabitants protection against their nocturnal enemy.

The conductor, in Fig. 4, should be about 10 inches long—one end, of the same size and form as the openings in the hive, tapering to the other end, to the size of half an inch with a lip or shield of sufficient size to prevent the return of the bees, which is not effected by any of the tubes long in use for that purpose.

I do not claim to have invented the use of a screen in any of the forms in which it may have been applied to beehives merely, but

What I claim, and desire to secure by Letters Patent, as my invention is—

A sash door with a woven wire screen in combination with projecting parts of the hive, so constructed as to form a recess or space in front of the hive of sufficient size to accommodate a cluster of bees according to their habits of hanging outside the hive, and so that they may be inclosed and protected whether outside or inside of the hive, by closing the door at night from the moths as herein specified.

JOSEPH A. DUGDALE.

Witnesses:
M. F. BENNETT,
JOHN DUGDALE.